Oct. 12, 1965

H. TOWNE 3,210,876

LUMINOUS DEVICES

Filed Jan. 10, 1964

INVENTOR.
HERBERT TOWNE
BY
Kenyon & Kenyon
ATTORNEYS

Oct. 12, 1965  H. TOWNE  3,210,876
LUMINOUS DEVICES
Filed Jan. 10, 1964  2 Sheets-Sheet 2
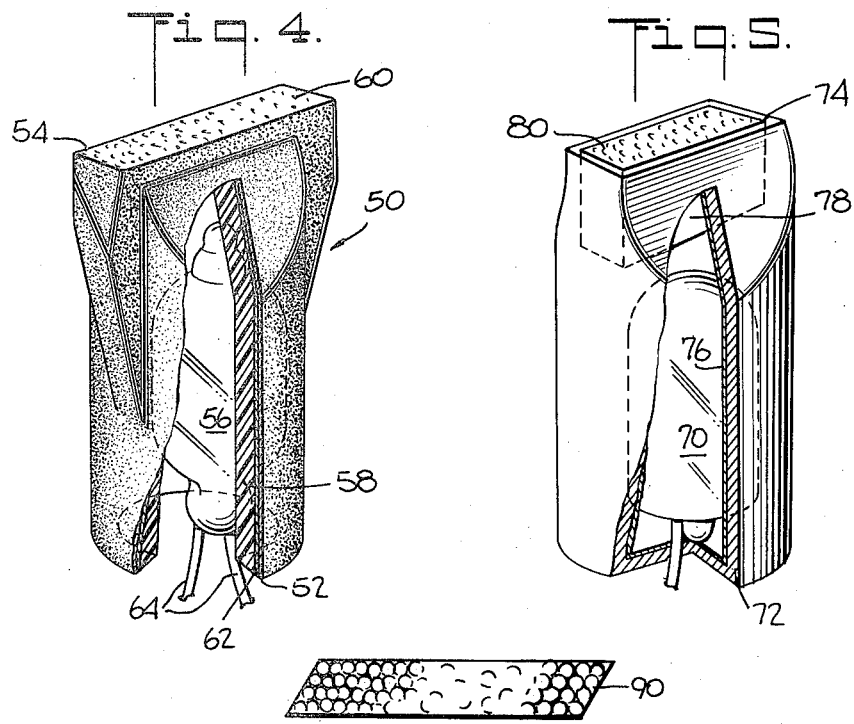
INVENTOR.
HERBERT TOWNE
BY
ATTORNEYS

United States Patent Office 3,210,876
Patented Oct. 12, 1965

3,210,876
LUMINOUS DEVICES
Herbert Towne, Roslyn, N.Y., assignor to Dialight Corporation, Brooklyn, N.Y., a corporation of Delaware
Filed Jan. 10, 1964, Ser. No. 337,059
4 Claims. (Cl. 40—130)

My invention relates to improvements in luminous devices designed to convey information to a viewer and, more particularly, to luminous devices which convey information by means of a changing pattern of lighted areas in an unlighted background.

Luminous devices which visibly display alpha-numeric or similar information have a wide variety of applications. For example, such devices have been used as read-outs for digital voltmeters, tachometers and clocks, and for frequency counters, computer consoles and stock market quotation displays. Currently available read-outs are commonly characterized, however, by one or more shortcomings or disadvantages.

Some presently available read-out devices require the use of high wattage light sources; others provide informational characters which are not sharp and clear, or which flicker, are not uniformly lit, or do not have a natural appearance, or are not readable under conditions of high ambient light or from the side of the read-out device. Other presently available read-out devices, due to the use of moving parts or complex principles of operation, are too noisy, or too high in cost, large in size or low in reliability for certain applications.

It is one object of my invention to provide a luminous device which furnishes a bright luminous element with a low wattage light source.

It is another object of my invention to provide a luminous device which integrates the light flux emitted by a light source and directs it toward the emitting area of the device.

It is another object of my invention to provide a luminous device which furnishes a luminous element with sharply defined contours and a configuration which can be effectively combined with similar elements to form easily-read characters, and which is also uniformly lit over its area and does not flicker.

It is a further object of my invention to provide a read-out device which presents sharp and clear informational characters readable at wide angles and under conditions of high ambient light.

It is a still further object of my invention to provide a read-out device which presents alpha-numeric and similar information by selected lighting of portions of an array of line-like luminous segments which have ends contiguous to one another, so that the informational characters which are thereby formed appear unbroken in configuration and natural in appearance.

It is an additional object of my invention to provide a read-out device which is relatively simple in operation and has no moving parts.

Still another object of my invention is to provide a read-out device which is relatively low in cost, small in size and high in reliability and which requires minimal maintenance.

Other objects and features of my invention will become apparent from the following description and the accompanying drawings forming a part hereof in which:

FIGURE 4 is a partially diagrammatic and partially cross sectional perspective view of one embodiment of the luminous device of my invention, showing a neon lamp and also successive layers of transparent, diffusely reflective and opaque materials surrounding the lamp;

FIGURE 5 is a partially diagrammatic and partially cross sectional perspective view of another luminous device embodying my invention, showing an incandescent lamp, successive layers of diffusely reflective and opaque materials surrounding the lamp, and a light director of transparent material mounted above the lamp;

FIGURES 6a, 6b and 6c are schematic representations of the line-like emitting area of a luminous device embodying my invention whose surface has been adapted to be diffusely emissive; FIGURE 6a showing a lenticulated emitting area, FIGURE 6b showing a grooved emitting area and FIGURE 6c showing a roughened emitting area;

Briefly stated, the preferred embodiment of the read-out device of my invention comprises an enclosing module or receptacle having an opaque front face with a plurality of line-like openings therethrough, and a plurality of luminous devices within the receptacle. Each luminous device has a line-like emitting area which is mounted in one of the line-like openings of the front face of the module, the emitting area of each luminous device being independently illuminable to form a segment of a predetermined information character. A luminous device embodying my invention in brief comprises a light cell with an opening at one end and a light source enclosed within the cell; the cell comprising a layer of reflective material surrounding the light source, a sheath of opaque material, and a light conducting portion terminating in a line-like light emitting area.

Figure 1:
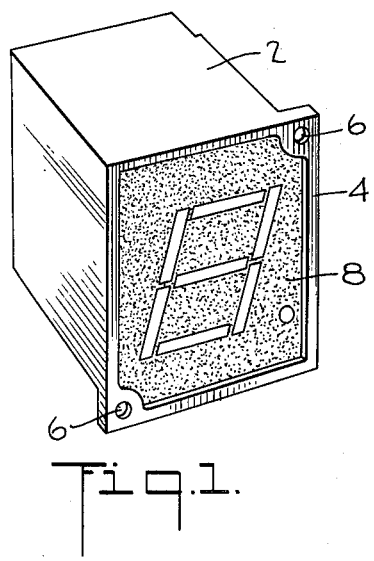
FIGURE 1 is a perspective view of a read-out device embodying my invention having a viewing face of opaque, non-reflecting material with a plurality of line-like openings and a circular opening, into each of which openings the emitting area of a luminous device has been mounted.

Turning to the figures, FIGURE 1 is a perspective view of a read-out module 2 embodying my invention which has a substantially rectangular housing 4 and clearance holes 6 for mounting the module to a frame, bracket or the like by means of mounting screws. Module 2 has an opaque, non-reflective viewing face 8. Viewing face 8 may be integral with the front of housing 4 or it may be a separate plate. In either case it would be dark in color to provide maximum contrast, opaque to prevent passage of light through it, and non-reflecting to mitigate reflections. It may be finished, for example, with flat, black paint to obtain these characteristics.

Figure 2:
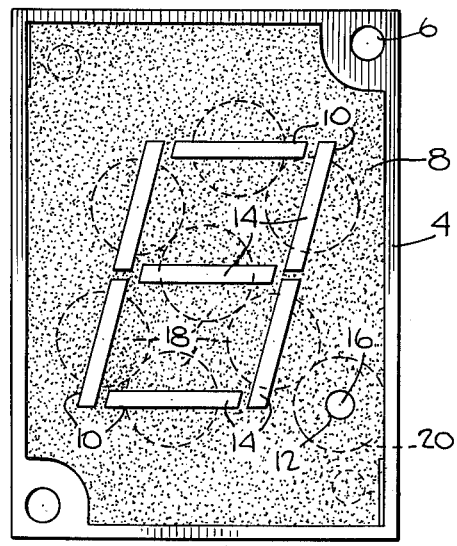
FIGURE 2 is a partially schematic front view of the read-out device of FIGURE 1, the dashed lines representing luminous devices whose emitting areas are mounted in the viewing face of the read-out module.

As shown in FIGURE 2, which is a partially schematic front view of the read-out device 2 of FIGURE 1, viewing face 8 has seven line-like openings 10 and a circular opening 12. Into each of these openings the emitting areas 14, 16 at the end portion of a luminous device within housing 4 has been mounted and exposed to view. Openings 10, 12 and emitting areas 14, 16 preferably lie in a single plane, thereby permitting wide angle viewing of the face of the module.

Dashed lines 18 schematically represent an array of luminous devices contained within housing 4, whose generally rectangular emitting areas 14 are mounted in viewing face 8. When these luminous devices are selectively energized, their generally rectangular emitting areas 14 will appear as lines of light, and, depending upon which combination of the array of luminous devices is energized, numerals from 0 to 9 will be defined. Thus, if all the luminous devices are energized the numeral 8 will be defined.

As the line-like luminous segments are arranged with their ends contiguous to one another, the informational characters formed when they are illuminated appear unbroken in configuration and natural in appearance. The read-out device 2 of FIGURES 1 and 2 is primarily for numeric display. It is apparent, however, that similar arrays of luminous line-like segments may be used for the display of alphabetical and other informational characters.

Emitting area 16 at the end portion of the luminous device represented by dashed line 20 is circular rather than line-like in form and, when illuminated, appears as a period or a decimal point, a character of particular use where a number of read-out devices similar to that shown in FIGURES 1 and 2 are arranged side by side to form a multi-digit number. It is apparent a comma or other character could also be similarly displayed.

Figure 3:
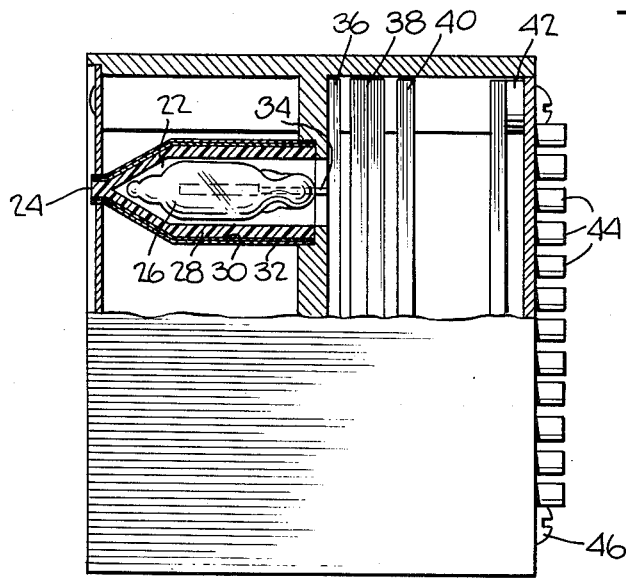
FIGURE 3 is a partially diagrammatic and partially cross sectional side view of the read-out device of FIGURES 1 and 2, showing a typical luminous device mounted in the viewing face of the read-out module, and various circuit and contact boards mounted at the rear of the module.

FIGURE 3 is a partially diagrammatic and partially cross sectional side view of the read-out device 2 of FIGURES 1 and 2, showing a luminous device 22 with emitting area 24 at its end portion mounted in the viewing face of module 2. The luminous device shown in FIGURE 3 comprises a neon lamp 26 within a transparent sheath 28, which sheath is coated first with diffusely reflective material 30 and then with opaque material 32. The base of luminous device 22 is fitted within a cross piece or housing 4.

Lead wires 34 of the neon lamp are electrically connected to printed circuit lamp board 36. Lamp board 36 is in turn electrically connected to an intermediate pressure-type contact board 38, which board is in turn electrically connected to lamp encoding matrix board 40. Matrix board 40 converts the input to module 2 to signals suitable to actuate lamps such as neon lamp 24 which are connected to lamp board 36. At the rear of module 2 spacing washer 42 and input terminals 44 are shown, the latter extending from the rear of housing 4. In the preferred embodiment of my invention, housing 4 is made of opaque polycarbonate plastic.

Screws 46 hold the various elements of the module together. The neon lamps illustrated by lamp 26 can be removed from the module and replaced when necessary simply by removing these screws and sliding the lamps and associated circuit boards out of the rear of housing 4. Input terminals 44 may be of a type which will permit the module to be plugged into a digital voltmeter, computer console or other instrument from which input signals are obtained, providing further ease of maintenance and use.

FIGURES 4 and 5 are partially diagrammatic and cross sectional perspective views of two embodiment of the luminous device of my invention.

The luminous device 50 of FIGURE 4 comprises an opaque sheath 52 having a generally rectangular opening 54 at one end; a light source 56 and a layer 58 of transparent material within sheath 52, the latter corresponding in form to that of the sheath, extending into opening 54, and having an exposed surface 60 which is preferably diffusely emissive; and a layer 62 of diffusely reflective material between layer 58 and sheath 52.

In this embodiment of my invention, light source 56 is shown as a neon lamp having lead wires 64 for circuit connections. An incandescent lamp or other equivalent light source may also be used.

Opaque sheath 52 is of black lacquer, aluminum or the like, and serves to prevent stray light from leaving or entering the sheath through its wall and thereby interfering with the desired illumination of emitting area 60. Layer 62 is of diffusely reflective material such as a metal or a pigment in a paint or lacquer. It serves to reflect the light flux emitted by lamp 56, allowing it to leave the interior of the luminous device primarily only through emitting area 60. In the preferred embodiment of my invention, layer 62 is white lacquer.

Layer 58 is composed of a transparent material which has a high index of refraction and a high optical clarity. In the embodiment of my invention shown in FIGURE 4 I find acrylic plastic preferable since it has satisfactory optical clarity. (Its light transmission when tested pursuant to A.S.T.M. D672 is approximately 92% and its haze ranges from 1 to 3%) and a satisfactory index of refraction (approximately 1.49 compared to air when tested pursuant to A.S.T.M. D542). In addition, acrylic plastic is light in weight, does not yellow with age, is not affected by the rise in temperature induced by neon lamp 56, and may be readily formed into the desired configurations.

FIGURE 5 illustrates another embodiment of my invention in which an incandescent lamp 70 is contained within a substantially cylindrical opaque sheath 72 which has a generally rectangular opening 74 at one end and a layer 76 of diffusely reflective material on its inside surface. Also shown in FIGURE 5 is a substantially rectangular transparent member 78 which is within sheath 72 between the incandescent lamp and opening 74. This transparent member extends into opening 74 and has an exposed surface 80 which is preferably diffusely emissive.

In this embodiment sheath 72 may be of any suitably rigid material such as aluminum or an opaque plastic. Layer 76 is preferably a white lacquer coating of high and diffuse reflecting quality. In another embodiment, the interior surface of sheath may itself be reflective. The transparent light conductive member 78 of FIGURE 5 is preferably acrylic plastic.

It will be noted that the base portion of sheath 72 shown in FIGURE 5 is closed, having openings therethrough only for the wire leads 84 of incandescent lamp 70, whereas the base portion of sheath 52 of FIGURE 4 is open. These are alternative designs: the design of FIGURE 4 being preferable for applications where it is desirable to permit lamp 56 to be readily removed and replaced; the design of FIGURE 5 being preferable for applications where it is desirable to enclose the luminous device.

It should also be noted that while the light source illustrated in FIGURE 4 is a neon lamp and that in FIGURE 5 is an incandescent lamp, either light source may be used in either embodiment, and equivalent light sources may be used as well. I have found that one advantage of the luminous device of my invention is that it functions satisfactorily with relatively low power light sources.

FIGURES 6a, 6b and 6c are schematic representations of a line-like emitting area of a luminous device after its surface has been adapted to be diffusely emissive.

Thus, FIGURE 6a illustrates an emitting area 90 with a beaded or lenticulated surface. FIGURE 6b illustrates an emitting area 92 whose surface has an array of narrow, parallel grooves, preferably equally spaced, and FIGURE 6c illustrates an emitting area 94 with a surface randomly roughened by rubbing an abrasive such as emery cloth across it. Methods such as these serve to refract the light passing through the emitting area from the light source, and thereby serve to enhance the uniformity of the light emitted by emitting area 92, a phenomenon sometimes described as secondary emission.

It will be noted that in the embodiments of my invention shown in FIGURES 4 and 5, the light source is in both cases nearly completely enclosed within an opaque member which has either a diffusely reflective inside surface or a layer of diffusely reflective material on its inside surface. The light emitted by the lamp is thereby reflected in such a manner that the inside surface is nearly equally lighted. Further, in both embodiments, light entering a transparent member is reflected back and forth within the transparent member, the member acting as a light director or conductor, conducting light to an emitting surface. This emitting surface is in both embodiments mounted in an opening in the opaque wall of the luminous device, and is preferably treated so as to be diffusely emissive. Thus, in both the embodiment of FIGURE 4 and also the embodiment of FIGURE 5 the light flux emitted by the light source is effectively integrated within the luminous device, and effectively directed toward the device's emitting area.

It is seen that by practicing my invention in the manners described it is possible to use a low wattage light source to provide a bright, uniformly-lit luminous element with sharply-defined contours and a configuration which can be combined with similar elements to form easily-read informational characters, and that this may be done by integrating the light flux emitted by a light source and directing it toward the emitting area of the luminous device. It is also seen that by practicing my invention in the manners described it is possible to provide a read-out device which is relatively simple in operation with no moving parts, which is relatively low in cost, small in size and high in reliability and requires minimal maintenance, and wihch presents sharp and clear informational characters readable at wide angles and under conditions of high ambient light.

Although spceific embodiments of my invention have been described and shown, variations in structural detail and method steps within the scope and appended claims are possible and are contemplated. There is therefore no intention of limitation of the exact structures and methods which I have set forth herein.

I claim:

1. A luminous device comprising a sheath of opaque material having an opening at one end thereof; a sheath of diffusely reflective material which is within the sheath of opaque material and has an opening at one end aligned within the opening in the sheath of opaque material; a light source within the sheath of diffusely reflective material; and a transparent member within the sheath of diffusely reflective material, the sheath of opaque material, the sheath of diffusely reflective material and the transparent member having a common longitudinal axis, said transparent member receiving light rays radially from said light source, a portion of the transparent member being between the light source and the opening of the sheath of diffusely reflective material and extending into the opening of the sheath of diffusely reflective material, and a portion of the transparent member extending within the sheath of diffusely reflective material alongside the light source, the said portion of the transparent member which extends into the opening of the sheath of diffusely reflective material having an exposed surface which is shaped to define at least a portion of a predetermined informational character, whereby a portion of the light emitted by the light source is reflected by the diffusely reflective material, passes through a portion of the transparent member and then passes through the opening of the sheath of opaque material.

2. A luminous device comprising a sheath of opaque material having an opening at one end thereof; a sheath of diffusely reflective material which is within the sheath of opaque material and has a line-like opening at one end aligned within the opening in the sheath of opaque material; a light source within the sheath of diffusely reflective material; and a transparent member within the sheath of diffusely reflective material, the sheath of opaque material, the sheath of diffusely reflective material and the transparent member having a common longitudinal axis, said transparent member receiving light rays radially from said light source, a portion of the transparent member being between the light source and the opening of the sheath of diffusely reflective material and extending into the opening of the sheath of diffusely reflective material, and a portion of the transparent member extending within the sheath of diffusely reflective material alongside the light source, the said portion of the transparent member which extends along a given side of the light source having a dimension perpendicular to the longitudinal axis of the side which is substantially less than its longitudinal dimension, the said portion of the transparent member which extends into the opening of the sheath of diffusely reflective material having an exposed surface which is diffusely emissive and is substantially perpendicular to the longitudinal axis of the transparent member, whereby a portion of the light emitted by the light source is reflected by the diffusely reflective material, passes through a portion of the transparent member and then passes through the opening of the sheath of opaque material.

3. A luminous device comprising a sheath of opaque material having an opening at one end thereof; a sheath of diffusely reflective material which is within the sheath of opaque material and has an opening at one end aligned within the opening in the sheath of opaque material; a light source within the sheath of diffusely reflective material; and a transparent member within the sheath of diffusely reflective material, the sheath of opaque material, the sheath of diffusely reflective material and the transparent member having a common longitudinal axis, said transparent member receiving light rays radially from said light source, a portion of the transparent member being between the light source and the opening of the sheath of diffusely reflective material and extending into the opening of the sheath of diffusely reflective material, and a portion of the transparent member extending within the sheath of diffusely reflective material alongside the light source, the said portion of the transparent member which extends into the opening of the sheath of diffusely reflective material line-like, diffusely emissive, exposed surface which is substantially perpendicular to the longitudinal axis of the transparent member and is shaped to define at least a portion of a predetermined informational character, and the said portion of the transparent member which extends along a given side of the light source having a dimension perpendicular to the longitudinal axis of the side which is substantially less than its longitudinal dimension, whereby a portion of the light emitted by the light source is reflected by the diffusely reflective material, passes through a portion of the transparent member and then passes through the opening of the sheath of opaque material.

4. A read-out device comprising a receptacle having an opaque front face with a plurality of line-like openings therethrough and a plurality of luminous devices within the receptacle, each luminous device having a line-like emitting area which is within one of the line-like openings of the front face of the receptacle, each luminous device being independently illuminable to form a segment of a predetermined informational character, and each luminous device comprising a sheath of opaque material having an opening at one end thereof; a sheath of diffusely reflective material which is within the sheath of opaque material and has an opening at one end aligned within the opening in the sheath of opaque material; a light source within the sheath of diffusely reflective material; and a transparent member within the sheath of diffusely reflective material, the sheath of opaque material, the sheath of diffusely reflective material and the transparent member having a common longitudinal axis, said transparent member receiving light rays radially from said light source, at least a portion of which transparent member is between the light source and the opening of the sheath of diffusely reflective material and extends into the opening of the sheath of diffusely reflective material, and a portion of which extends within the sheath of diffusely reflective material alongside the light source, the said portion of the transparent member which extends into the opening of the sheath of diffusely reflective material having an exposed surface which is shaped to define at least a portion of a predetermined informational character, whereby a portion of the light emitted by the light source is reflected by the diffusely reflective material, passes through a portion of the transparent member and then passes through the opening of the sheath of opaque material.

References Cited by the Examiner

UNITED STATES PATENTS

| | | | |
|---|---|---|---|
| 974,943 | 11/10 | Wood | 40—130 X |
| 2,137,360 | 11/38 | Skelsey | 40—130 |
| 2,230,152 | 1/41 | Wolfrey | 40—130 |
| 2,354,367 | 7/44 | Ford | 40—130 |
| 2,448,244 | 8/48 | Arnold | 40—130 |
| 2,639,528 | 5/53 | Ochsner | 40—130 |
| 2,826,680 | 3/58 | Cline | 40—130 X |
| 2,880,536 | 4/59 | Sullivan | 40—130 |
| 3,096,594 | 7/63 | Skrobisch | 40—130 X |

JEROME SCHNALL, *Primary Examiner.*

UNITED STATES PATENT OFFICE
CERTIFICATE OF CORRECTION

Patent No. 3,210,876              October 12, 1965

Herbert Towne

It is hereby certified that error appears in the above numbered patent requiring correction and that the said Letters Patent should read as corrected below.

Column 3, line 29, for "or" read -- of --; column 6, line 32, after "material" insert -- having a --.

Signed and sealed this 26th day of April 1966.

(SEAL)
Attest:

ERNEST W. SWIDER              EDWARD J. BRENNER
Attesting Officer              Commissioner of Patents